United States Patent
Qi et al.

(10) Patent No.: US 12,498,481 B2
(45) Date of Patent: Dec. 16, 2025

(54) SYSTEMS AND METHODS FOR ODOMETRY ENHANCED REAL-TIME COOPERATIVE RELATIVE POSE ESTIMATION FOR COOPERATIVE LIDAR PERCEPTION

(71) Applicant: Toyota Motor engineering & Manufacturing North America, Inc., Plano, TX (US)

(72) Inventors: Xuewei Qi, Mountain View, CA (US); Qi Chen, San Jose, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 885 days.

(21) Appl. No.: 17/744,842

(22) Filed: May 16, 2022

(65) Prior Publication Data
US 2023/0367013 A1 Nov. 16, 2023

(51) Int. Cl.
*G01S 17/58* (2006.01)
*G01S 7/4861* (2020.01)
(Continued)

(52) U.S. Cl.
CPC ............ *G01S 17/58* (2013.01); *G01S 7/4861* (2013.01); *G01S 17/89* (2013.01); *G06T 17/05* (2013.01); *G06T 2207/10028* (2013.01)

(58) Field of Classification Search
CPC ........ G01S 13/865; G01S 17/58; G01S 17/86; G01S 17/875; G01S 17/89; G01S 17/931; G01S 7/003; G01S 7/4861; G06T 17/00; G06T 17/05; G06T 19/20; G06T 2207/10028; G06T 2210/56;
(Continued)

(56) References Cited

U.S. PATENT DOCUMENTS

| | | |
|---|---|---|
| 9,199,643 B1 | 12/2015 | Zeng |
| 10,325,411 B1 | 6/2019 | Laney et al. |

(Continued)

OTHER PUBLICATIONS

Wang et al. ("Simultaneous Pose Estimation and Velocity Estimation of an Ego Vehicle and Moving Obstacles Using LiDAR Information Only", IEEE, vol. 23, No. 8, Aug. 2022, pp. 12121-12132) (Year: 2022).*

(Continued)

*Primary Examiner* — Hina F Ayub
(74) *Attorney, Agent, or Firm* — Christopher G. Darrow; Darrow Mustafa PC

(57) ABSTRACT

System, methods, and other embodiments described herein relate to cooperative perception. In one embodiment, a method includes computing, at a first timestep, a base relative pose between an ego vehicle and a remote vehicle based upon respective point clouds of the ego vehicle and the remote vehicle. The method includes computing, at a second timestep, a relative pose between the ego vehicle and the remote vehicle based upon the base relative pose, a first temporal relative pose of the ego vehicle, and a second temporal relative pose received from the remote vehicle. The method includes generating a combined point cloud based upon a first point cloud of the ego vehicle, a second point cloud received from the remote vehicle, and the relative pose.

18 Claims, 8 Drawing Sheets

(51) Int. Cl.
  *G01S 17/89*  (2020.01)
  *G06T 17/05*  (2011.01)
(58) Field of Classification Search
  CPC ........... G06T 2210/61; G06T 2219/024; G06T 2219/2004
  See application file for complete search history.

(56) References Cited

U.S. PATENT DOCUMENTS

| | | |
|---|---|---|
| 10,466,064 B2 | 11/2019 | Max et al. |
| 10,535,191 B2 | 1/2020 | Sachdeva et al. |
| 2019/0331496 A1 | 10/2019 | Dhome et al. |

OTHER PUBLICATIONS

Ye, H., et al., "LiDar and Inertial Fusion for Pose Estimation by Non-linear Optimization", Retrieved from https://www.arxiv-vanity.com/papers/1710.07104.pdf, Oct. 19, 2017, in pp. 18.

Hery, E. et al., "LiDar based relative pose and covariance estimation for communicating vehicles exchanging a polygonal model of their shape", Sorbonne universités, Université de Technologie de Compiègne, Retrieved from https://project.inria.fr/ppniv18/files/2018/10/paper21.pdf, Oct. 1, 2018, in 6 pages.

Dynamic Robot Systems Group, "LiDar Simultaneous Localization and Mapping", Oxford Robotics Institute, Retrieved from https://ori.ox.ac.uk/labs/drs/lidar-simultaneous localization-and-mapping/, 2020, in 3 pages.

\* cited by examiner $$Trans_{1-2}^{T_1} = \boxed{Trans_{1-2}^{T_0}} + \boxed{Trans_1^{T_1-T_0} - Trans_2^{T_1-T_0}}$$

Relative translation between two sensors obtained by ICP in 1HZ

Temporal relative Translation obtained by LiDAR odometry on each vehicle in 10HZ $$Rotation_{1-2}^{T_1} = \boxed{Rotation_{1-2}^{T_0}} * \boxed{\left(\frac{Rotation_1^{T_1-T_0}}{Rotation_2^{T_1-T_0}}\right)}$$

Relative rotation between two sensors obtained by ICP in 1HZ

Temporal relative rotation obtained by LiDAR odometry on each vehicle in 10HZ

FIG. 6

SYSTEMS AND METHODS FOR ODOMETRY ENHANCED REAL-TIME COOPERATIVE RELATIVE POSE ESTIMATION FOR COOPERATIVE LIDAR PERCEPTION

TECHNICAL FIELD

The subject matter described herein relates, in general, to determining a relative pose between vehicles, and, more particularly, to utilizing the relative pose to stitch different point clouds generated by the vehicles.

BACKGROUND

Vehicles may be equipped with sensors that facilitate perceiving other vehicles, obstacles, pedestrians, and additional aspects of a surrounding environment. For example, a vehicle may be equipped with a light detection and ranging (LIDAR) sensor that uses light to scan the surrounding environment. Logic associated with the LIDAR analyzes acquired data to perform various functionality, such as object detection, vehicle localization, and high-definition (HD) mapping. This acquired data can be useful in various circumstances for improving perceptions of the surrounding environment so that systems such as autonomous driving systems can perceive the noted aspects and accurately plan and navigate accordingly.

Autonomous driving systems may consider LIDAR data from a single LIDAR sensor for navigating about an environment. The single LIDAR sensor may have a limited field of view or sensing range. As such, it may be desirable to combine (e.g., stitch) disparate point clouds (representing different regions of the environment) together in order to provide an autonomous driving system with more information to base navigational decisions thereon. Combining point clouds captured by different LIDAR sensors typically requires determining a transformation that can be used to transform the point clouds into a common reference frame. The transformation may be referred to as a relative pose that comprises a translation vector and a rotation matrix.

Various approaches may estimate relative pose. In one approach, a relative pose between two LIDAR sensors is based upon geometric shape matching with an iterative optimization method (e.g., iterative closest point (ICP)). However, continuously performing an iterative optimization method is computationally burdensome and may be difficult to run in real-time. In another approach, an HD map is utilized to determine an absolute pose of the two LIDAR sensors. The relative pose of the two LIDAR sensors is subsequently determined based upon the absolute pose. However, HD maps may not be available for every environment. Additionally, processing an HD map may be computationally burdensome. Furthermore, HD maps tend to be expensive and may become outdated as environments change. The above-described approaches may be supplemented with global positioning system (GPS) data in order to improve estimation of the relative pose. However, GPS data may not always be available, such as when a vehicle travels in a tunnel or an urban canyon.

SUMMARY

In one embodiment, example systems and methods relate to a manner of improving cooperative perception between an ego vehicle and a remote vehicle. According to embodiments, a system of an ego vehicle computes, at a first timestep, a base relative pose (i.e., translation and rotation) between the ego vehicle and the remote vehicle based upon respective point clouds of the ego vehicle and the remote vehicle. The system may compute the base relative pose using an iterative closest point (ICP) algorithm, which may be computationally intensive, and hence the system may compute the base relative pose at a first frequency, e.g., 1 Hz.

At a second timestep, the system computes a relative pose between the ego vehicle and the remote vehicle based upon the base relative pose, a first temporal relative pose of the ego vehicle, and a second temporal relative pose received from the remote vehicle, where the first temporal pose and the second temporal pose are respectively indicative of motion changes of the ego vehicle and the remote vehicle between the second timestep and the first timestep. The first temporal relative pose and the second temporal relative pose may be computed based upon odometry data generated by the ego vehicle and the remote vehicle, and hence such computations may be less computationally intensive in comparison to computation of the base relative pose. As such, the first temporal relative pose and the second temporal relative pose may be computed at a second frequency that is greater than the first frequency, such as 10 Hz. By utilizing the base relative pose to compute the relative pose, the system is able to accurately compute relative poses at 10 Hz, while only executing the ICP algorithm at 1 Hz, thus avoiding incurring computational costs that would occur if the ICP algorithm were executed at 10 Hz.

At the second timestep, the system obtains an ego vehicle point cloud generated by the ego vehicle and a remote vehicle point cloud generated by the remote vehicle. At the second timestep, the system generates a combined point cloud (i.e., a stitched point cloud) based upon the ego vehicle point cloud, the remote vehicle point cloud, and the relative pose. The system may stitch point clouds at the second frequency (e.g., 10 Hz) while computing the base relative pose at the first frequency (e.g., 1 Hz). Thus, the system is able to compute real-time, accurate relative poses between the ego vehicle and the remote vehicle while executing the ICP algorithm at the first frequency. The combined point cloud may represent a larger field of view than that of the ego vehicle point cloud, and as a result, a navigational decision of the ego vehicle based upon the combined point cloud may be more optimal than a navigational decision based solely upon the ego vehicle point cloud. Accordingly, the system enables the ego vehicle to rapidly (e.g., at 10 Hz) stitch point clouds of the ego vehicle and the remote vehicle, while only executing the ICP algorithm at 1 Hz.

In one embodiment, a computing system for cooperative perception between an ego vehicle and a remote vehicle is disclosed. The computing system includes a processor and memory communicably coupled to the processor. The memory stores instructions that, when executed by the processor, cause the processor to compute, at a first timestep, a base relative pose between the ego vehicle and the remote vehicle based upon respective point clouds of the ego vehicle and the remote vehicle. The instructions further cause the processor to compute, at a second timestep, a relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep. The instructions further cause the processor to generate a combined point cloud based upon a first point cloud of the ego vehicle, a second point cloud received from the remote vehicle, and the relative pose.

In one embodiment, a non-transitory computer-readable medium for cooperative perception between an ego vehicle and a remote vehicle and including instructions that, when executed by a processor, cause the processor to compute, at a first timestep, a base relative pose between the ego vehicle and the remote vehicle based upon respective point clouds of the ego vehicle and the remote vehicle. The instructions further cause the processor to compute, at a second timestep, a relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep. The instructions further cause the processor to generate a combined point cloud based upon a first point cloud of the ego vehicle, a second point cloud received from the remote vehicle, and the relative pose.

In one embodiment, a method is disclosed. The method includes computing, at a first timestep, a base relative pose between an ego vehicle and a remote vehicle based upon respective point clouds of the ego vehicle and the remote vehicle. The method further includes computing, at a second timestep, a relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep. The method further includes generating a combined point cloud based upon a first point cloud of the ego vehicle, a second point cloud received from the remote vehicle, and the relative pose.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates computation of a relative pose between an ego vehicle and a remote vehicle according to an embodiment.

DETAILED DESCRIPTION

Figure 1:
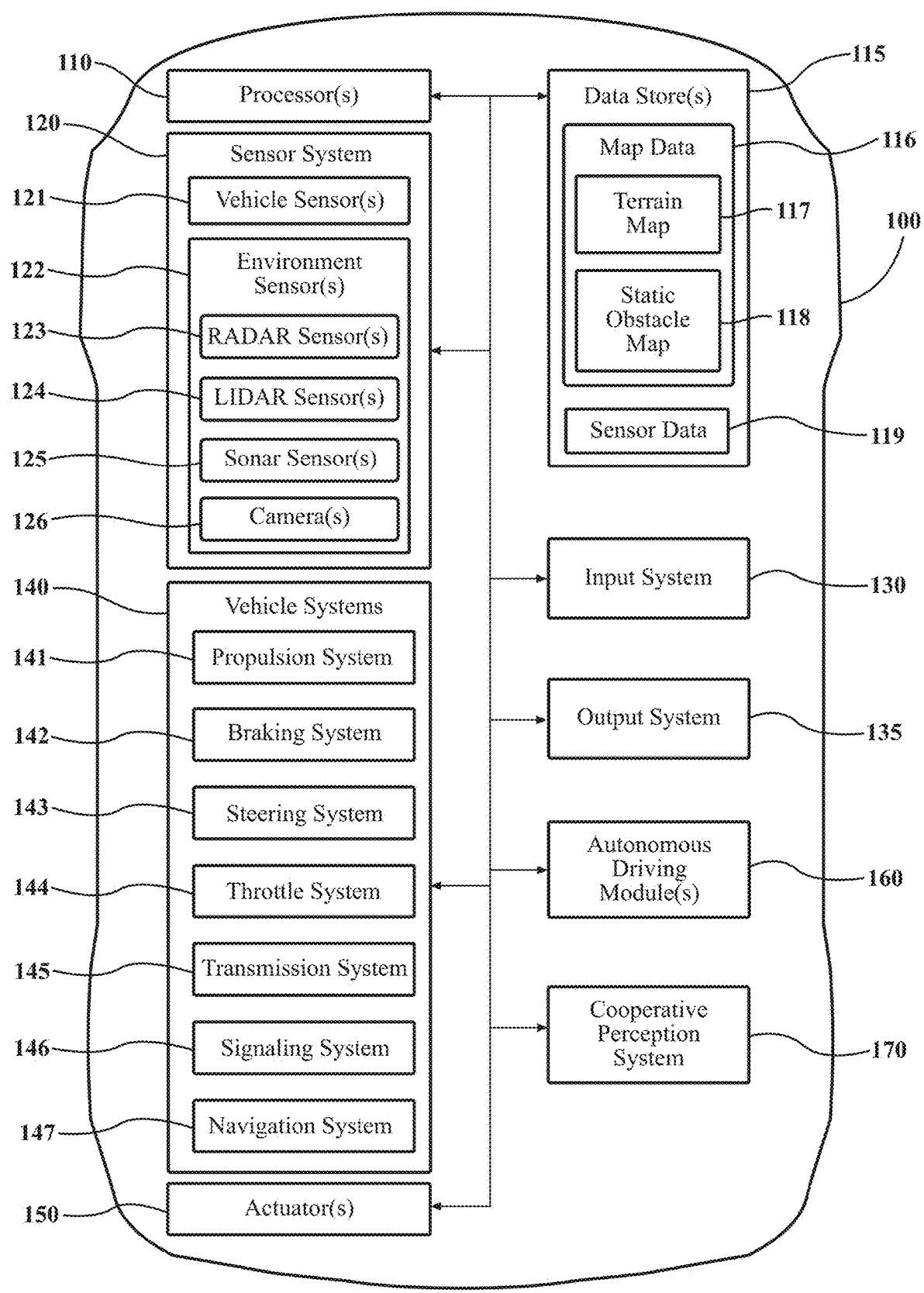
FIG. 1 illustrates one embodiment of a vehicle within which systems and methods disclosed herein may be implemented.

Systems, methods, and other embodiments associated with improving relative pose estimation between ego vehicles and remote vehicles are disclosed herein. Stitching a remote vehicle point cloud generated by a remote vehicle with an ego vehicle point cloud generated by an ego vehicle may typically involve the ego vehicle determining a transformation (referred to as a relative pose) that maps the remote vehicle point cloud into a reference frame of the ego vehicle point cloud. Approaches to relative pose estimation may be based upon geometric shape matching with iterative optimization methods and/or may be HD-map based. Approaches to relative pose estimation may also utilize GPS data in order to improve relative pose estimation. Such approaches may suffer from various difficulties, such as the computational burden of continually running iterative optimization methods, the unavailability of updated HD maps, and the unavailability of GPS data in certain environments.

To address the aforementioned difficulties, a cooperative perception system ("the system") of an ego vehicle is described. According to embodiments, at a first timestep, the system obtains respective point clouds generated by a LIDAR sensor of the ego vehicle and by a LIDAR sensor of a remote vehicle in proximity to the ego vehicle. According to embodiments, the system transmits one or more requests to the remote vehicle using vehicle-to-everything (V2X) communication technology. The remote vehicle transmits its respective point cloud to the ego vehicle upon receiving the request. At the first timestep, the system computes a base relative pose (i.e., a base translation vector and a base rotation matrix) between the ego vehicle and the remote vehicle based upon the respective point clouds. According to embodiments, the system computes the base relative pose at a first frequency, such as 1 Hz. According to embodiments, the system applies an iterative closest points (ICP) algorithm to the ego vehicle point cloud and the remote vehicle point cloud. The base relative pose is obtained as a by-product of the ICP algorithm. According to embodiments, the base relative pose is a transformation that minimizes an error metric between points of the respective point clouds. Computing the base relative pose may be a relatively computationally intense process and may be performed at 1 Hz (once per second). As such, the system may utilize the base relative to derive relative poses between the ego vehicle and the remote vehicle at subsequent timesteps.

The system computes a first temporal relative pose of the ego vehicle based upon odometry data of the ego vehicle. The first temporal relative pose is indicative of motion change of the ego vehicle between a second timestep and the first timestep. The first temporal relative pose comprises a first translation vector and a first rotation matrix. According to embodiments, the system computes the first temporal relative pose at a second frequency, such as 10 Hz. The remote vehicle may compute a second temporal relative pose of the remote vehicle in a similar manner as the system of the ego vehicle. The second temporal relative pose comprises a second translation vector and a second rotation matrix. According to embodiments, the remote vehicle computes the second temporal relative pose at the second frequency. The system obtains the second temporal relative pose from the remote vehicle. Computing the aforementioned temporal relative poses based upon odometry data may not be as computationally intensive as computing the base relative pose described above. As such, the temporal relative poses may be computed at 10 Hz (ten times per second).

At the second timestep, the system computes a relative pose (i.e., a translation vector and a rotation matrix) between the ego vehicle and the remote vehicle based upon the base relative pose, the first temporal relative pose, and the second temporal relative pose. According to embodiments, the system computes the relative pose at the second frequency. As such, the system may utilize the relative pose to stitch point clouds generated by ego vehicle and the remote vehicle in real-time without having to execute the ICP algorithm at the second frequency. In an example, the system generates the translation vector by summing the base translation vector with a difference between the first translation vector and the second translation vector. In an example, the system generates the rotation matrix by multiplying the base rotation matrix with a quotient of the first rotation matrix and the second rotation matrix.

The system obtains an ego vehicle point cloud generated by the ego vehicle and a remote vehicle point cloud generated by the remote vehicle. The system generates a combined point cloud based upon the ego vehicle point cloud, the remote vehicle point cloud, and the relative pose. According to embodiments, the system transforms the remote vehicle point cloud using the relative pose to generate a transformed point cloud and stitches the ego vehicle point cloud to the transformed point cloud to generate the combined point cloud. According to embodiments, the system stitches point clouds at the second frequency (e.g., 10 Hz). In an example, the combined point cloud represents a field of view that is greater than a field of view of the ego vehicle point cloud or the remote vehicle point cloud. According to embodiments, the system controls the ego vehicle based upon the combined point cloud. According to embodiments, the system determines a location of the ego vehicle within an environment based upon the combined point cloud.

In an example, at a third timestep, the system computes a second relative pose between the ego vehicle and the remote vehicle based upon the (previously computed) relative pose, a third temporal relative pose of the ego vehicle, and a fourth temporal relative pose received from the remote vehicle. The third temporal relative pose and the fourth temporal relative pose are respectively indicative of motion changes of the ego vehicle and the remote vehicle between the third timestep and the second timestep. The system may utilize the second relative pose to generate a new combined point cloud at the third timestep based upon newly obtained point clouds from the ego vehicle and the remote vehicle. Thus, by reusing previously computed relative poses to determine current relative poses, the system is able to determine a current relative pose at 10 Hz while only executing an ICP algorithm at 1 Hz. As such, the system is computationally efficient.

The above-described technologies present various advantages over other approaches for relative pose estimation. First, the above-described technologies do not require the use of pure geometric shape matching methods and hence reduce computational overhead of relative pose estimation. As such, the above-described technologies are well-suited for real-time performance. For example, as described above, the above-described technologies may execute an ICP algorithm one time per second in order to generate a base relative pose between an ego vehicle and a remote vehicle. The above-described technologies may utilize the base relative pose to estimate the relative pose ten times per second. Thus, the above-described technologies avoid the computationally burdensome process of executing the ICP algorithm ten times per second. Second, the above-described technologies do not require the use of an HD map in order to determine relative pose. As such, the above-described technologies may avoid the disadvantages of HD map-based approaches to relative pose estimation described above. Third, the above-described technologies do not require the use of a high-precision GPS device. As such, the above-described technologies are well-suit for operation in environments in which GPS reception is limited, such as in a tunnel or an urban canyon.

Referring to FIG. 1, an example of a vehicle 100 is illustrated. The vehicle 100 is alternatively referred to as "the ego vehicle 100" herein. As used herein, a "vehicle" is any form of motorized transport. In one or more implementations, the ego vehicle 100 is an automobile. While arrangements will be described herein with respect to automobiles, it will be understood that embodiments are not limited to automobiles. In some implementations, the ego vehicle 100 may be any robotic device or form of motorized transport that, for example, includes sensors to perceive aspects of the surrounding environment, and thus benefits from the functionality discussed herein associated with determining a relative pose between the ego vehicle 100 and a remote vehicle, and utilizing the relative pose to stitch point clouds generated by the ego vehicle 100 and the remote vehicle. As a further note, this disclosure generally discusses the ego vehicle 100 as traveling on a roadway with surrounding vehicles, which are intended to be construed in a similar manner as the ego vehicle 100 itself. That is, the surrounding vehicles can include any vehicle that may be encountered on a roadway by the ego vehicle 100.

The ego vehicle 100 also includes various elements. It will be understood that in various embodiments it may not be necessary for the ego vehicle 100 to have all of the elements shown in FIG. 1. The ego vehicle 100 can have any combination of the various elements shown in FIG. 1. Further, the ego vehicle 100 can have additional elements to those shown in FIG. 1. In some arrangements, the ego vehicle 100 may be implemented without one or more of the elements shown in FIG. 1. While the various elements are shown as being located within the ego vehicle 100 in FIG. 1, it will be understood that one or more of these elements can be located external to the ego vehicle 100. Further, the elements shown may be physically separated by large distances. For example, as discussed, one or more components of the disclosed system can be implemented within a vehicle while further components of the system are implemented within a cloud-computing environment or other system that is remote from the ego vehicle 100.

Some of the possible elements of the ego vehicle 100 are shown in FIG. 1 and will be described along with subsequent figures. However, a description of many of the elements in FIG. 1 will be provided after the discussion of FIGS. 2-8 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the ego vehicle 100 includes a cooperative perception system 170 that is implemented to perform methods and other functions as disclosed herein relating to improving point cloud stitching via derivation of a relative pose between the ego vehicle 100 and another vehicle, where the derivation is based upon a base relative pose. As will be discussed in greater detail subsequently, the cooperative perception system 170, in various embodiments, is implemented partially within the ego vehicle 100, and as a cloud-based service. For example, in one approach, functionality associated with at least one module of the cooperative perception system is implemented within the ego vehicle 100 while further functionality is implemented within a cloud-based computing system.

Figure 2:
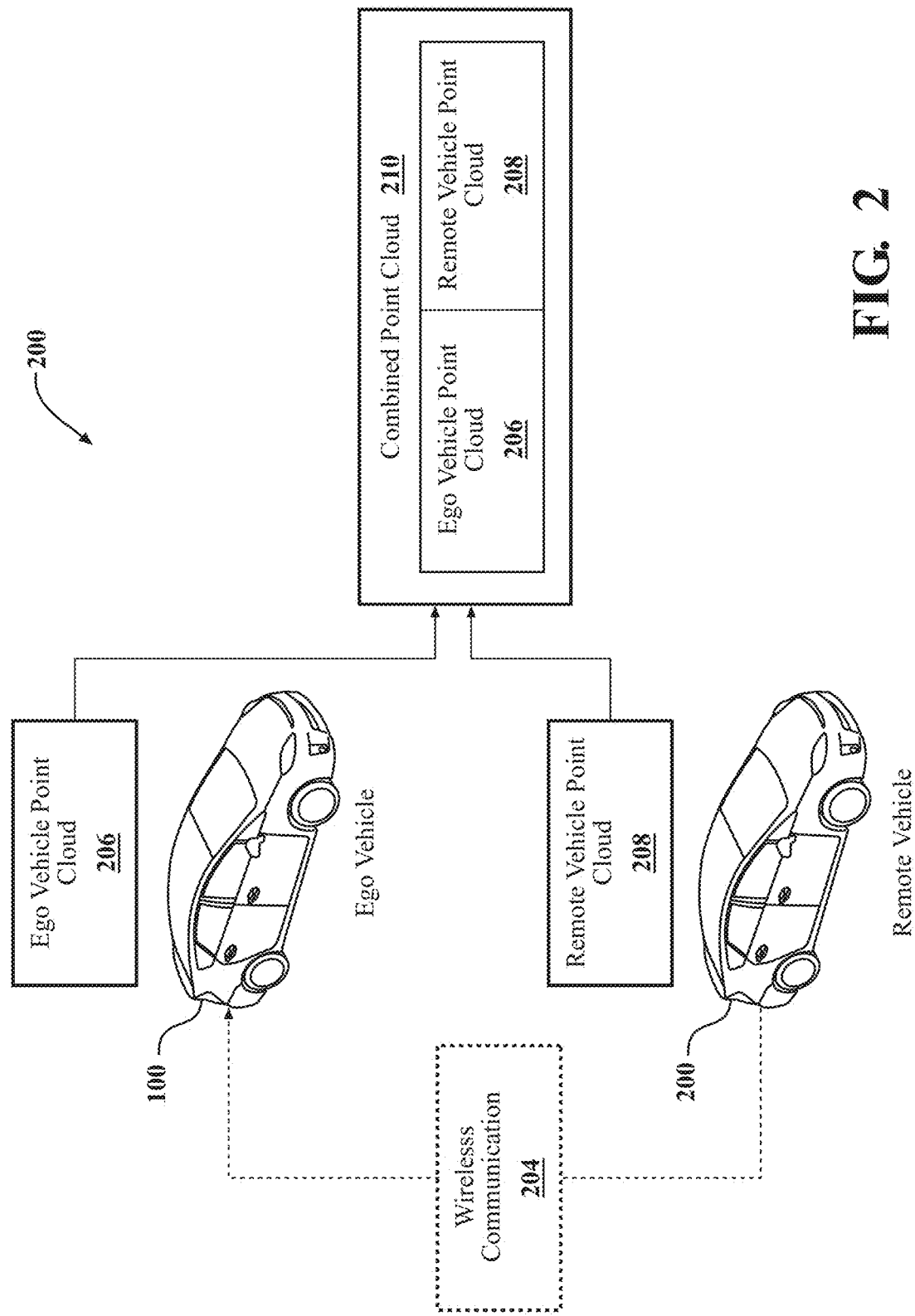
FIG. 2 illustrates an example environment that is associated with cooperative perception.

Turning now to FIG. 2, an example environment 200 that is associated with cooperative perception is illustrated. The environment 200 includes the ego vehicle 100 and a remote vehicle 202 that is in proximity to the ego vehicle 100. The ego vehicle 100 and the remote vehicle 202 are in wireless communication 204. For example, the ego vehicle 100 and the remote vehicle 202 may communicate using a vehicle-to-everything (V2X) communication protocol. LIDAR sensors of the ego vehicle 100 and the remote vehicle 202 generate an ego vehicle point cloud 206 and a remote vehicle point cloud 208. In an example, the ego vehicle point cloud 206 represents a first field of view of the environment 200 and the remote vehicle point cloud 208 represents a second field of view of the environment 200. The first field of view and the second field of view may overlap in part. As will be described in greater detail below, the cooperative perception system 170 of the ego vehicle 100 determines a relative pose between the ego vehicle 100 and the remote vehicle 202 and utilizes the relative pose to generate a combined point cloud 210 that is based upon the ego vehicle point cloud 206 and the remote vehicle point cloud 208.

Figure 3:
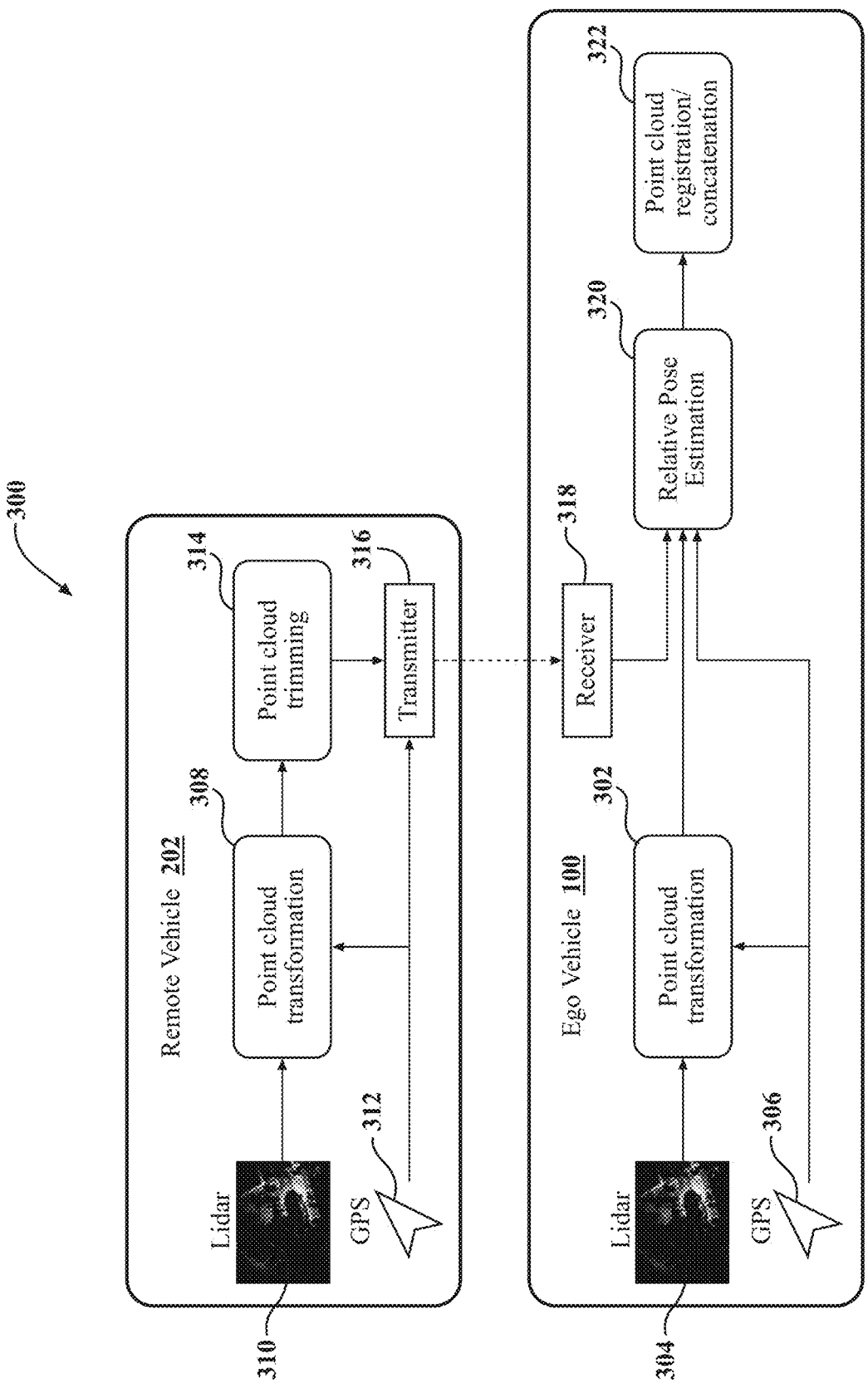
FIG. 3 illustrates an example high-level overview of a cooperative perception process according to an embodiment.

Referring now to FIG. 3 in conjunction with FIGS. 1 and 2, an example high-level overview of a cooperative perception process 300 is illustrated. At 302, the ego vehicle 100 may apply transformations to a first base point cloud 304 generated by a lidar sensor 124 of the ego vehicle 100. According to embodiments, the transformations are based upon first GPS data 306 generated by the ego vehicle 100.

At 308, the remote vehicle 202 may apply transformations to a second base point cloud 310 generated by the remote vehicle 202. According to embodiments, the transformations are based upon second GPS data 312 generated by the remote vehicle 202. At 314, the remote vehicle 202 may "trim" the second base point cloud 310. For instance, the remote vehicle 202 may downsample the second base point cloud 310.

A transmitter 316 of the remote vehicle 202 may transmit the second base point cloud 310 to a receiver 318 of the ego vehicle 100. The transmitter 316 may also transmit the second GPS data 312 to the receiver 318. The transmitter 316 additionally transmits a temporal relative pose of the remote vehicle 202 (explained in greater below) to the receiver 318. The transmitter 316 and the receiver 318 may enable the wireless communication 204.

At 320, the ego vehicle 100 computes a relative pose between the ego vehicle 100 and the remote vehicle 202. The ego vehicle 100 computes the relative pose based upon a base relative pose (computed based upon the first base point cloud 304 and the second base point cloud 310), the temporal relative pose of the remote vehicle 202, and a temporal relative pose of the ego vehicle 100. The ego vehicle 100 may additionally compute the relative pose based upon the first GPS data 306 and/or the second GPS data 312. At 322, the ego vehicle 100 may register and concatenate the ego vehicle point cloud 206 and the remote vehicle point cloud 208 to generate the combined point cloud 210. The ego vehicle 100 generates the combined point cloud based upon the ego vehicle point cloud 206, the remote vehicle point cloud 208, and the relative pose.

Figure 4:
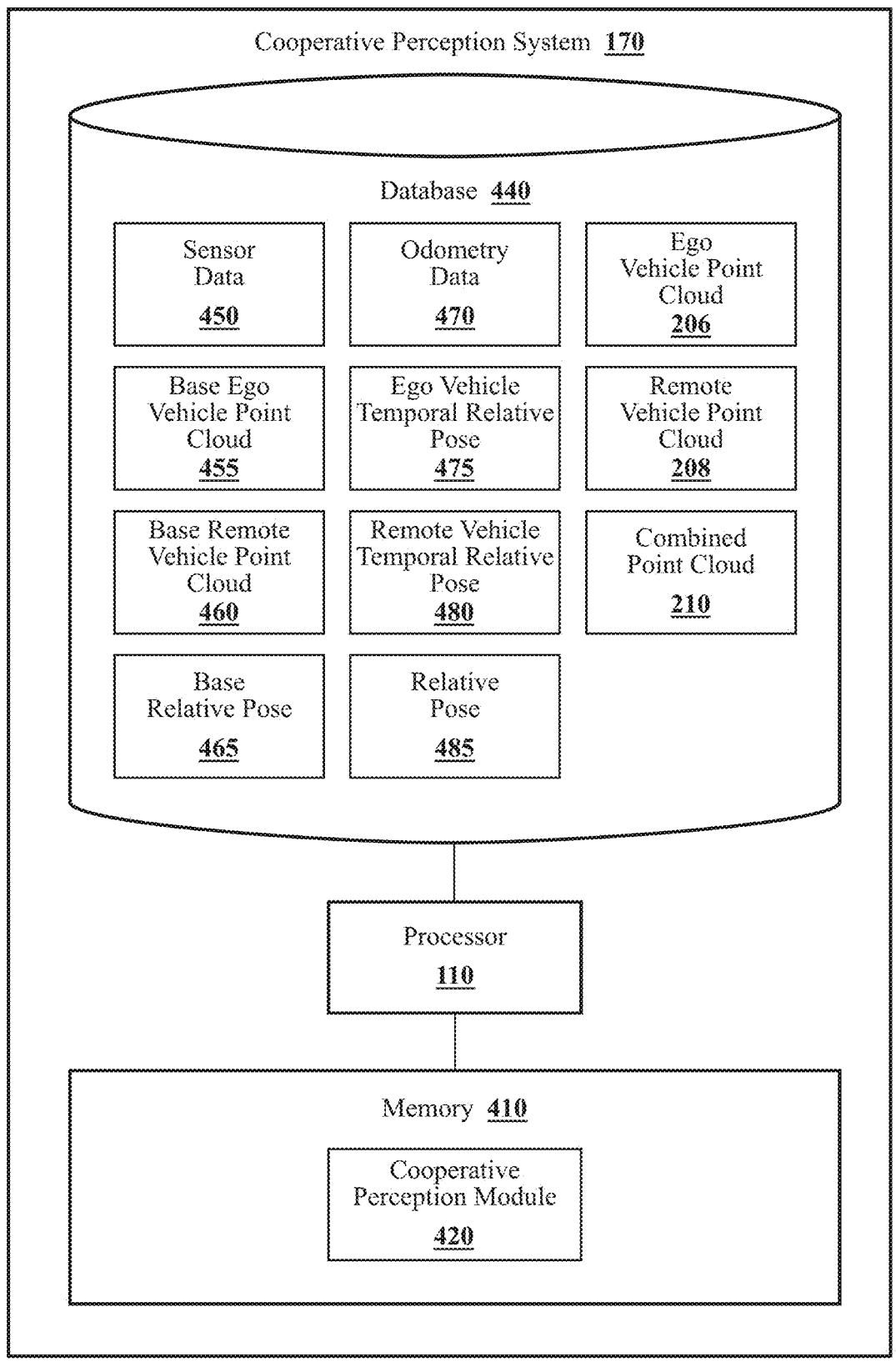
FIG. 4 illustrates one embodiment of a cooperative perception system that is associated with determining a relative pose between an ego vehicle and a remote vehicle.

With reference to FIG. 4, one embodiment of the cooperative perception system 170 of FIG. 1 is further illustrated. The cooperative perception system 170 is shown as including a processor 110 from the ego vehicle 100 of FIG. 1. Accordingly, the processor 110 may be a part of the cooperative perception system 170, the cooperative perception system 170 may include a separate processor from the processor 110 of the ego vehicle 100, or the cooperative perception system 170 may access the processor 110 through a data bus or another communication path. In one embodiment, the cooperative perception system 170 includes a memory 410 that stores a cooperative perception module 420. The memory 410 is a random-access memory (RAM), read-only memory (ROM), a hard-disk drive, a flash memory, or other suitable memory for storing the cooperative perception module 420. The cooperative perception module 420 is, for example, computer-readable instructions that when executed by the processor 110 cause the processor 110 to perform the various functions disclosed herein.

The cooperative perception module 420 generally includes instructions that function to control the processor 110 to receive data inputs from one or more sensors of the ego vehicle 100. The inputs are, in one embodiment, observations of one or more objects in an environment proximate to the ego vehicle 100 and/or other aspects about the surroundings. As provided for herein, the cooperative perception module 420, in one embodiment, acquires sensor data 450 that includes at least camera images. In further arrangements, the cooperative perception module 420 acquires the sensor data 450 from further sensors such as a radar 123, a LIDAR 124, and other sensors as may be suitable for identifying vehicles and locations of the vehicles.

Accordingly, the cooperative perception module 420, in one embodiment, controls the respective sensors to provide the data inputs in the form of the sensor data 450. Additionally, while the cooperative perception module 420 is discussed as controlling the various sensors to provide the sensor data 450, in one or more embodiments, the cooperative perception module 420 can employ other techniques to acquire the sensor data 450 that are either active or passive. For example, the cooperative perception module 420 may passively sniff the sensor data 450 from a stream of electronic information provided by the various sensors to further components within the ego vehicle 100. Moreover, the cooperative perception module 420 can undertake various approaches to fuse data from multiple sensors when providing the sensor data 450 and/or from sensor data acquired over a wireless communication link (e.g., v2v) from one or more of the surrounding vehicles. Thus, the sensor data 450, in one embodiment, represents a combination of perceptions acquired from multiple sensors.

In addition to locations of surrounding vehicles, the sensor data 450 may also include, for example, information about lane markings, and so on. Moreover, the cooperative perception module 420, in one embodiment, controls the sensors to acquire the sensor data 450 about an area that encompasses 360 degrees about the ego vehicle 100 in order to provide a comprehensive assessment of the surrounding environment. Of course, in alternative embodiments, the cooperative perception module 420 may acquire the sensor data 450 about a forward direction alone when, for example, the ego vehicle 100 is not equipped with further sensors to include additional regions about the ego vehicle 100 and/or the additional regions are not scanned due to other reasons (e.g., unnecessary due to known current conditions).

Moreover, in one embodiment, the cooperative perception system 170 includes a database 440. The database 440 is, in one embodiment, an electronic data structure stored in the memory 410 or another data store and that is configured with routines that can be executed by the processor 110 for analyzing stored data, providing stored data, organizing stored data, and so on. Thus, in one embodiment, the database 440 stores data used by the cooperative perception module 420 in executing various functions. In one embodiment, the database 440 includes the sensor data 450 along with, for example, metadata that characterize various aspects of the sensor data 450. For example, the metadata can include location coordinates (e.g., longitude and latitude), relative map coordinates or tile identifiers, time/date stamps from when the sensor data 450 was generated, and so on.

In one embodiment, the database 440 includes a base ego vehicle point cloud 455 (e.g., the first base point cloud 304) generated by the LIDAR sensor 124 of the ego vehicle 100 and a base remote vehicle point cloud 460 (e.g., the second base point cloud 310) generated by a LIDAR sensor of the remote vehicle 202. As will be described in greater detail below, the cooperative perception module 420 may be configured to execute an ICP algorithm on the base ego vehicle point cloud 455 and the base remote vehicle point cloud 460.

In one embodiment, the database 440 further includes a base relative pose 465 between the ego vehicle 100 and the remote vehicle 202. The cooperative perception module 420 computes the base relative pose 465 based upon the base ego vehicle point cloud 455 and the base remote vehicle point cloud 460. According to embodiments, the cooperative perception module 420 executes an iterative closest point (ICP) algorithm to generate the base relative pose 465. The base relative pose comprises a base translation vector and a base rotation matrix.

In one embodiment, the database 440 further includes odometry data 470 generated by the ego vehicle 100. According to embodiments, the odometry data 470 comprises LIDAR odometry data. According to embodiments, the odometry data 470 is supplemented by GPS data and/or data generated by an inertial measurement unit (IMU) of the ego vehicle 100.

In one embodiment, the database 440 further includes an ego vehicle temporal relative pose 475. The cooperative perception module 420 generates the ego vehicle temporal relative pose 475 based upon the odometry data 470. The ego vehicle temporal relative pose 475 is indicative of change in motion of the ego vehicle 100 between successive timesteps (e.g., between a second timestep and a first timestep, where the second timestep occurs after the first timestep). The ego vehicle temporal relative pose 475 comprises a first translation vector and a first rotation matrix.

In one embodiment, the database 440 further includes a remote vehicle temporal relative pose 480. The remote vehicle temporal relative pose 480 is generated by the remote vehicle 202 based upon odometry data generated by the remote vehicle 202. The remote vehicle temporal relative pose 480 is indicative of change in motion of the remote vehicle 202 between successive timesteps (e.g., between the second timestep and the first timestep). The remote vehicle temporal relative pose 480 comprises a second translation vector and a second rotation matrix. The ego vehicle 100 receives the remote vehicle temporal relative pose 480 from the remote vehicle 202 via the wireless communication 204.

In one embodiment, the database 440 further includes a relative pose 485 between the ego vehicle 100 and the remote vehicle 202. As will be described in greater detail below, the cooperative perception module 420 computes the relative pose 485 based upon the base relative pose 465, the ego vehicle temporal relative pose 475, and the remote vehicle temporal relative pose 480.

In one embodiment, the database 440 further includes the ego vehicle point cloud 206. The LIDAR sensor 124 of the ego vehicle 100 generates the ego vehicle point cloud 206. The ego vehicle point cloud 206 comprises points that are indicative of features of an environment of the ego vehicle 100. The ego vehicle point cloud 206 may represent a first field of view of the environment.

In one embodiment, the database 440 further includes the remote vehicle point cloud 208. A LIDAR sensor of the remote vehicle 202 generates the remote vehicle point cloud 208. The ego vehicle 100 receives the remote vehicle point cloud 208 from the remote vehicle 202 via the wireless communication 204.

In one embodiment, the database 440 further includes the combined point cloud 210. The combined point cloud 210 may comprises a combination of the ego vehicle point cloud 206 (or a portion thereof) and the remote vehicle point cloud 208 (or a portion thereof). According to embodiments, the combined point cloud 210 represents a field of view that is greater than the field of view of the ego vehicle point cloud 206.

Although the base ego vehicle point cloud 455, the base remote vehicle point cloud 460, the base relative pose 465, odometry data 470, the ego vehicle temporal relative pose 475, the remote vehicle temporal relative pose 480, the relative pose 485, the ego vehicle point cloud 206, the remote vehicle point cloud 208, and the combined point cloud 210 have been described above as being separate from the sensor data 450, it is to be understood that the base ego vehicle point cloud 455, the base remote vehicle point cloud 460, the base relative pose 465, odometry data 470, the ego vehicle temporal relative pose 475, the remote vehicle temporal relative pose 480, the relative pose 485, the ego vehicle point cloud 206, the remote vehicle point cloud 208, and the combined point cloud 210 may be included in the sensor data 450.

Example operation of the cooperative perception system 170 is now set forth. It is contemplated that the ego vehicle 100 and the remote vehicle 202 are operating in an environment (e.g., the environment 200). As the ego vehicle 100 operates in the environment, the LIDAR sensor 124 generates the base ego vehicle point cloud 455. Similarly, as the remote vehicle 202 operates in the environment, a (second) LIDAR sensor of the remote vehicle 202 generates the base remote vehicle point cloud 460.

The cooperative perception module 420 obtains the base ego vehicle point cloud 455 generated by the LIDAR sensor 124. The cooperative perception module 420 also obtains the base remote vehicle point cloud 460 from the remote vehicle 202. According to embodiments, the cooperative perception module 420 transmits a request to the remote vehicle 202 for the base remote vehicle point cloud 460. Upon receiving the request, the remote vehicle 202 transmits the base remote vehicle point cloud 460 to the cooperative perception module 420 via the wireless communication 204. According to embodiments, the remote vehicle 202 down-samples the base remote vehicle point cloud 460 prior to transmitting the remote vehicle point cloud 208 to the cooperative perception module 420. According to embodiments, the remote vehicle 202 transmits GPS data to the cooperative perception module 420 along with the base remote vehicle point cloud 460.

At a first timestep, the cooperative perception module 420 computes the base relative pose 465 between the ego vehicle 100 and the remote vehicle 202 based upon respective point clouds of the ego vehicle 100 and the remote vehicle 202 (e.g., the base ego vehicle point cloud 455 and the base remote vehicle point cloud 460). The base relative pose 465 comprises a base translation vector and a base rotation matrix. According to embodiments, the cooperative perception module 420 executes an ICP algorithm on the base ego vehicle point cloud 455 and the base remote vehicle point cloud 460, where the base relative pose 465 is generated as a by-product of the ICP algorithm. According to embodiments, the base relative pose 465 comprises a transformation that minimizes an error metric between first points of the base ego vehicle point cloud 455 and second points of the base remote vehicle point cloud 460. According to embodiments, the cooperative perception module 420 computes the base relative pose 465 at a first frequency. According to embodiments, the first frequency ranges from 0.5 to 1.5 Hz. In a specific example, the cooperative perception module 420 computes the base relative pose 465 at 1 Hz, that is, the cooperative perception module 420 computes the base relative pose 465 one time per second.

The cooperative perception module 420 obtains the odometry data 470. The cooperative perception module 420 computes the ego vehicle temporal relative pose 475 (i.e., a first temporal relative pose) based upon the odometry data 470. The ego vehicle temporal relative pose 475 is indicative of motion change of the ego vehicle 100 between successive timesteps (e.g., between a second timestep and the first timestep, where the second timestep occurs after the first timestep). The ego vehicle temporal relative pose 475 comprises a first translation vector and a first rotation matrix.

The remote vehicle 202 computes the remote vehicle temporal relative pose 480 (i.e., a second temporal relative pose) based upon the (second) odometry data generated by the remote vehicle 202. The remote vehicle temporal relative pose 480 is indicative of motion change of the remote vehicle 202 between successive timesteps (e.g., between the second timestep and the first timestep). The remote vehicle temporal relative pose 480 comprises a second translation vector and a second rotation matrix.

According to embodiments, the cooperative perception module 420 and the remote vehicle 202 respectively compute the ego vehicle temporal relative pose 475 and the remote vehicle temporal relative pose 480 at a second frequency. According to embodiments, the first frequency (at which the base relative pose 465 is generated) is less than the second frequency. According to embodiments, the second frequency ranges from 5 to 20 Hz. In a specific example, the cooperative perception module 420 computes the ego vehicle temporal relative pose 475 at 10 Hz, that is, the cooperative perception module 420 computes a temporal relative pose ten times per second.

As the ego vehicle 100 operates in the environment, the LIDAR sensor 124 generates the ego vehicle point cloud 206 at the second timestep. Similarly, as the remote vehicle 202 operates in the environment, the (second) LIDAR sensor of the remote vehicle 202 generates the remote vehicle point cloud 208 at the second timestep. The ego vehicle point cloud 206 represents a first field of view from the perspective of the LIDAR sensor 124. The remote vehicle point cloud 208 represents a second field of view from the perspective of the (second) LIDAR sensor of the remote vehicle 202.

At the second timestep, the cooperative perception module 420 computes the relative pose 485 between the ego vehicle 100 and the remote vehicle 202 based upon the base relative pose 465, the ego vehicle temporal relative pose 475, and the remote vehicle temporal relative pose 480. According to embodiments, the remote vehicle 202 broadcasts the remote vehicle temporal relative pose 480 at the second frequency described above. According to embodiments, the cooperative perception module 420 transmits a request (via the wireless communication 204) for the remote vehicle temporal relative pose 480 to the remote vehicle 202 and the remote vehicle 202 transmits (via the wireless communication 204) the remote vehicle temporal relative pose 480 to the cooperative perception module 420 upon receiving the request. According to embodiments, the cooperative perception module 420 computes the relative pose 485 at the second frequency (e.g., 10 Hz) described above.

Figure 5:
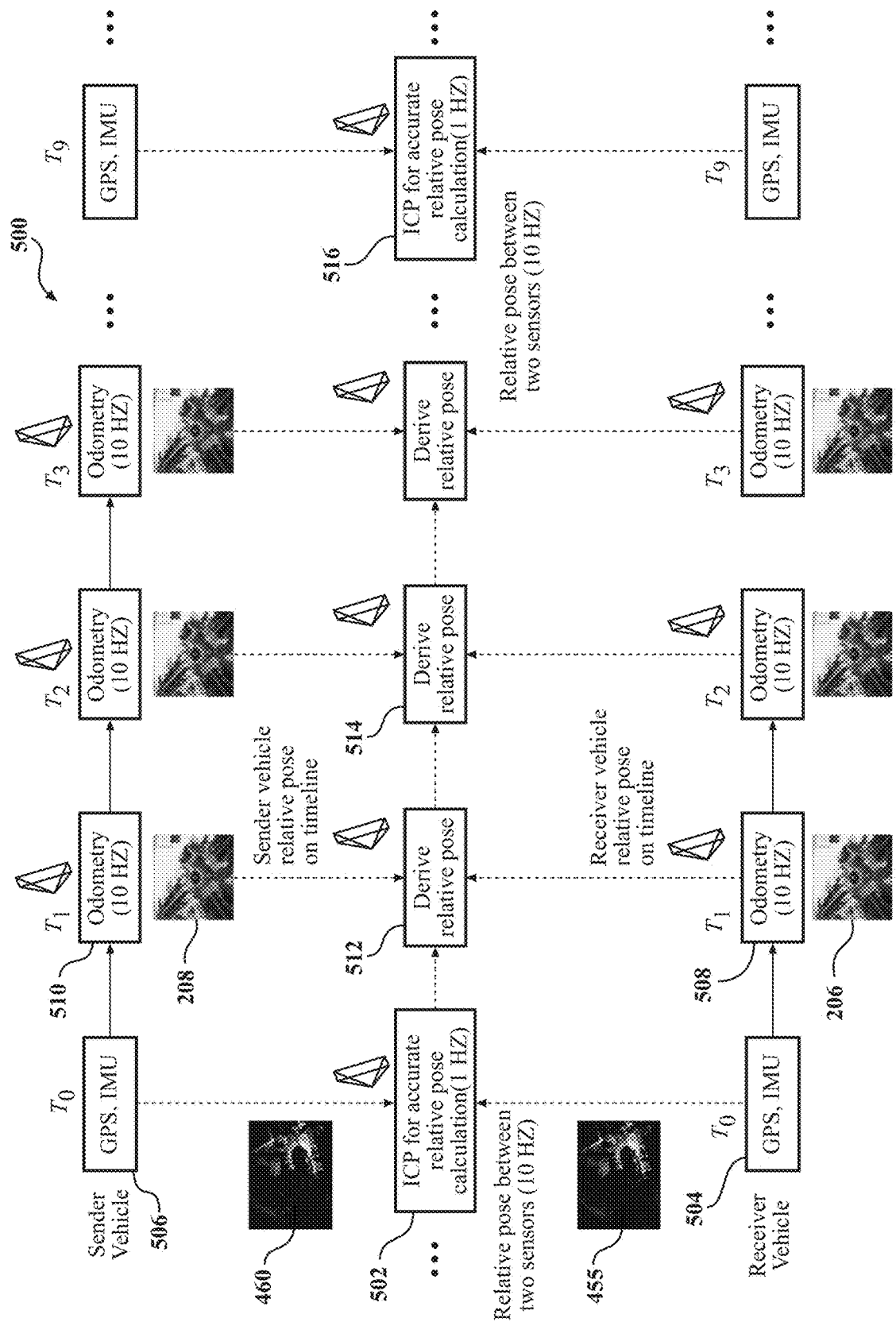
FIG. 5 illustrates a timeline of computing a relative pose between an ego vehicle and a remote vehicle according to an embodiment.

Referring now to FIG. 5 in conjunction with FIGS. 2 and 4, an example timeline 500 of computing a relative pose between the ego vehicle 100 and the remote vehicle 202 according to an embodiment is illustrated. In FIG. 5, the ego vehicle 100 is referred to as the "Receiver Vehicle" and the remote vehicle 202 is referred to as the "Sender Vehicle." Box 502 represents the cooperative perception module 420 computing the base relative pose 465 between the ego vehicle 100 and the remote vehicle 202 based upon the base ego vehicle point cloud 455 and the base remote vehicle point cloud 460 at a first timestep ($T_0$). Box 504 and box 506 indicate that the cooperative perception module 420 may additionally compute the base relative pose 465 based upon GPS data and IMU data generated by the ego vehicle 100 and the remote vehicle 202, respectively.

Box 508 and box 510 indicate that the ego vehicle 100 and the remote vehicle 202 respectively generate odometry data (e.g., the odometry data 470) at 10 Hz. As described above, the ego vehicle temporal relative pose 475 and the remote vehicle temporal relative pose 480 are are generated based upon odometry data. Box 512 represents the cooperative perception module 420 computing (i.e., deriving) the relative pose 485 between the ego vehicle 100 and the remote vehicle 202 at a second timestep ($T_1$). FIG. 5 indicates that the relative pose 485 may be computed at 10 Hz.

Box 514 represents the cooperative perception module 420 computing a second relative pose between the ego vehicle 100 and the remote vehicle 202 at a third timestep ($T_2$). The cooperative perception module 420 computes the second relative pose based upon the relative pose 485 (computed at $T_0$), a third temporal relative pose of the ego vehicle 100 computed at $T_1$, and a fourth temporal relative pose of the remote vehicle 202 computed at $T_1$. The cooperative perception module 420 may repeat this process for computing new relative poses between the ego vehicle 100 and the remote vehicle 202 for a fourth timestep ($T_3$), a fifth timestep ($T_4$), a sixth timestep ($T_5$), a seventh timestep ($T_6$), an eighth timestep ($T_7$), and a ninth timestep ($T_8$). At a tenth timestep ($T_9$), Box 516 represents the cooperative perception module 420 computing a new base relative pose in a manner similar to that described above.

Referring now to FIG. 6 in conjunction with FIG. 4, example computation of the relative pose 485 according to an embodiment is illustrated. The relative pose 485 comprises a translation vector and a rotation matrix. As illustrated in FIG. 6, the cooperative perception module 420 computes the translation vector and the rotation matrix according to equations (I) and (II), respectively:

$$\text{Trans}_{1-2}^{T_1} = \text{Trans}_{1-2}^{T_0} + \text{Trans}_1^{T_1-T_0} - \text{Trans}_2^{T_1-T_0} \quad (I)$$

$$\text{Rotation}_{1-2}^{T_1} = \text{Rotation}_{1-2}^{T_0} * \left( \frac{\text{Rotation}_1^{T_1-T_0}}{\text{Rotation}_2^{T_1-T_0}} \right) \quad (II)$$

As illustrated in equation (I) above, the cooperative perception module 420 generates the translation vector ($\text{Trans}_{1-2}^{T_1}$) by summing the base translation vector ($\text{Trans}_{1-2}^{T_0}$) with a difference between the first translation vector ($\text{Trans}_1^{T_1-T_0}$) and the second translation vector ($\text{Trans}_2^{T_1-T_0}$). As illustrated in equation (II) above, the cooperative perception module 420 generates the rotation matrix ($\text{Rotation}_{1-2}^{T_1}$) by multiplying the base rotation matrix ($\text{Rotation}_{1-2}^{T_0}$) with a quotient of the first rotation matrix ($\text{Rotation}_1^{T_1-T_0}$) and the second rotation matrix ($\text{Rotation}_2^{T_1-T_0}$).

The cooperative perception module 420 generates the combined point cloud 210 based upon the ego vehicle point cloud 206 and the remote vehicle point cloud 208. The ego vehicle point cloud 206 and the remote vehicle point cloud 208 may be generated at the second timestep. The combined point cloud 210 may represent a field of view that is greater than a field of view of the ego vehicle point cloud 206 or the remote vehicle point cloud 208. According to embodiments, the cooperative perception module 420 generates a transformed point cloud based upon the translation vector and the rotation matrix of the relative pose 485. The transformed point cloud is in the same reference frame (or a similar reference frame) as the ego vehicle point cloud 206. The cooperative perception module 420 stitches the ego vehicle point cloud 206 to the transformed point cloud to generate the combined point cloud 210.

According to embodiments, the cooperative perception module 420 (or the autonomous driving module 160) controls the ego vehicle 100 based upon the combined point cloud 210. According to embodiments, the cooperative perception module 420 determines a location of the ego vehicle 100 within the environment based upon the combined point cloud 210.

Figure 7:
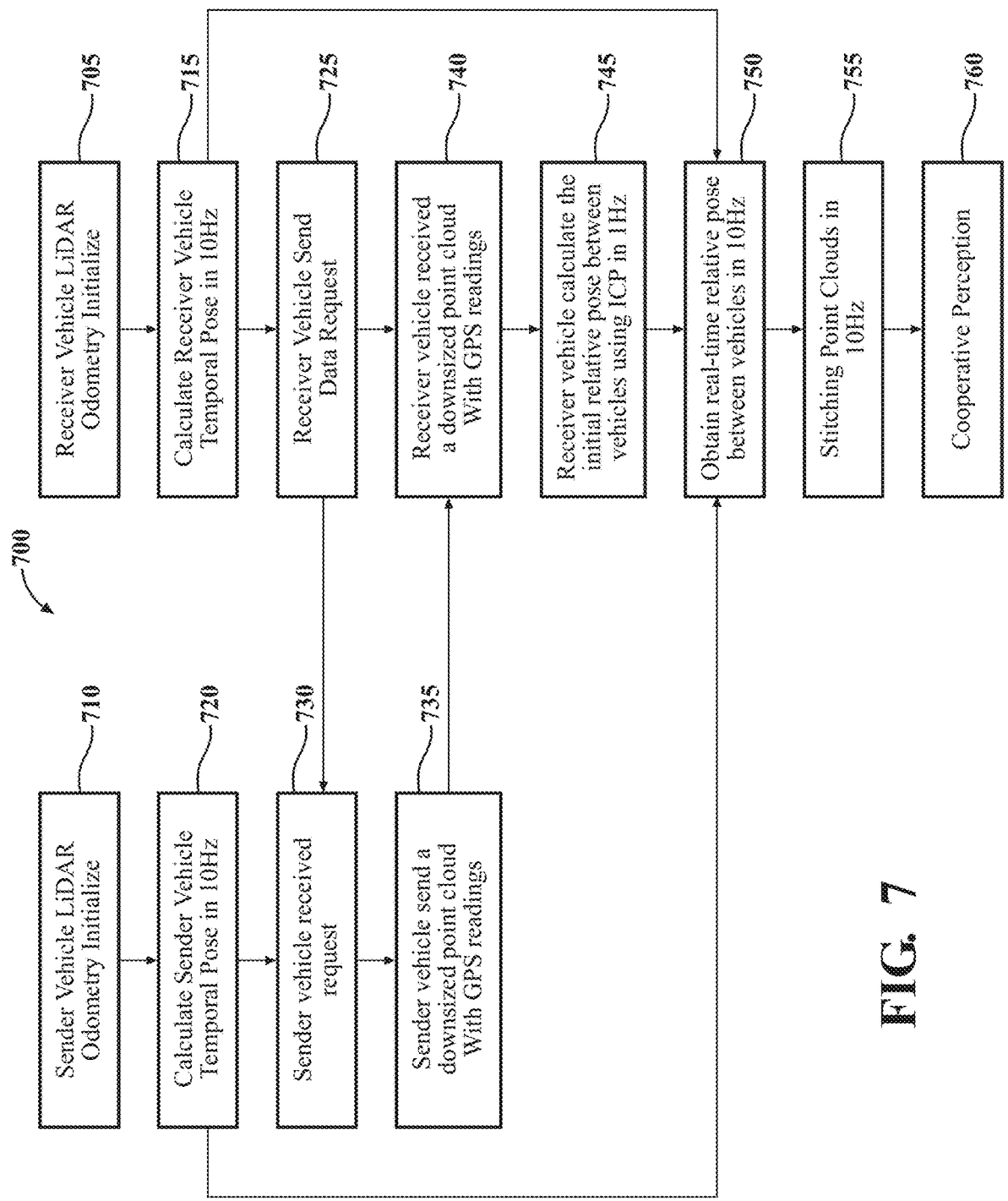
FIG. 7 illustrates one embodiment of a method that is associated with determining a relative pose between an ego vehicle and a remote vehicle.

Additional aspects of the cooperative perception system 170 will be discussed in relation to FIGS. 7 and 8. FIG. 7 illustrates a flowchart of a method 700 that is associated with determining a relative pose between the ego vehicle 100 and the remote vehicle 202 according to embodiment. The method 700 will be discussed from the perspective of the ego vehicle 100 and the remote vehicle 202 of FIGS. 1 and 2.

At 705, the ego vehicle 100 (referred to in FIG. 7 as "the receiver vehicle") initializes LIDAR odometry and begins to generate odometry data (e.g., the odometry data 470). At 710, the remote vehicle 202 (referred to in FIG. 7 as "the sender vehicle") initializes LIDAR odometry and begins to generate (second) odometry data.

At 715, the ego vehicle 100 computes a first temporal relative pose (referred to in FIG. 7 as "receiver vehicle temporal pose") of the ego vehicle 100 at 10 Hz, that is, the ego vehicle 100 computes the first temporal relative pose ten times per second. The first temporal relative pose is indicative of motion change of the ego vehicle 100 between successive timesteps. At 720, the remote vehicle 202 computes a second temporal relative pose (referred to in FIG. 7 as "sender vehicle temporal pose") of the remote vehicle 202 at 10 Hz, that is, the remote vehicle 202 computes the second temporal relative pose ten times per second. The second temporal relative pose is indicative of motion change of the remote vehicle 202 between successive timesteps.

At 725, the ego vehicle 100 (referred to in FIG. 7 as "Receiver vehicle") sends a data request to the remote vehicle (referred to in FIG. 7 as "the Sender vehicle"). At 730, the remote vehicle 202 receives the data request. At 735, the remote vehicle 202 sends a downsized point cloud and GPS readings (generated by the remote vehicle 202) to the ego vehicle 100 in response to receiving the request. At 740, the ego vehicle 100 receives the downsized point cloud and the GPS readings from the remote vehicle 202. At 745, the ego vehicle 100 computes a base relative pose (referred to in FIG. 7 as "the initial relative pose") between the ego vehicle 100 and the remote vehicle 202 by applying an ICP algorithm to the downsized point cloud and a point cloud generated by the ego vehicle 100. The ego vehicle 100 computes the base relative pose at 1 Hz, that is, the ego vehicle 100 computes the base relative pose one time per second. In an example, the ego vehicle 100 computes the base relative pose at a first timestep.

At 750, the ego vehicle 100 obtains a relative pose (referred to in FIG. 7 as a "real-time relative pose") between the ego vehicle 100 and the remote vehicle 202. For instance, the ego vehicle 100 computes the relative pose based upon the base relative pose, the first temporal relative pose, and the second temporal relative pose. The ego vehicle 100 receives the second temporal relative pose from the remote vehicle 202. For instance, the remote vehicle 202 may broadcast the second temporal relative pose. The ego vehicle 100 computes the relative pose at 10 Hz, that is, the ego vehicle 100 computes the relative pose ten times per second. In an example, the ego vehicle 100 computes the relative pose at a second timestep that occurs after the first timestep.

At 755, the ego vehicle 100 stitches, at 10 Hz, point clouds generated by the ego vehicle 100 and the remote vehicle 202 using the relative pose. At 760, the stitched point clouds enable cooperative perception.

Figure 8:
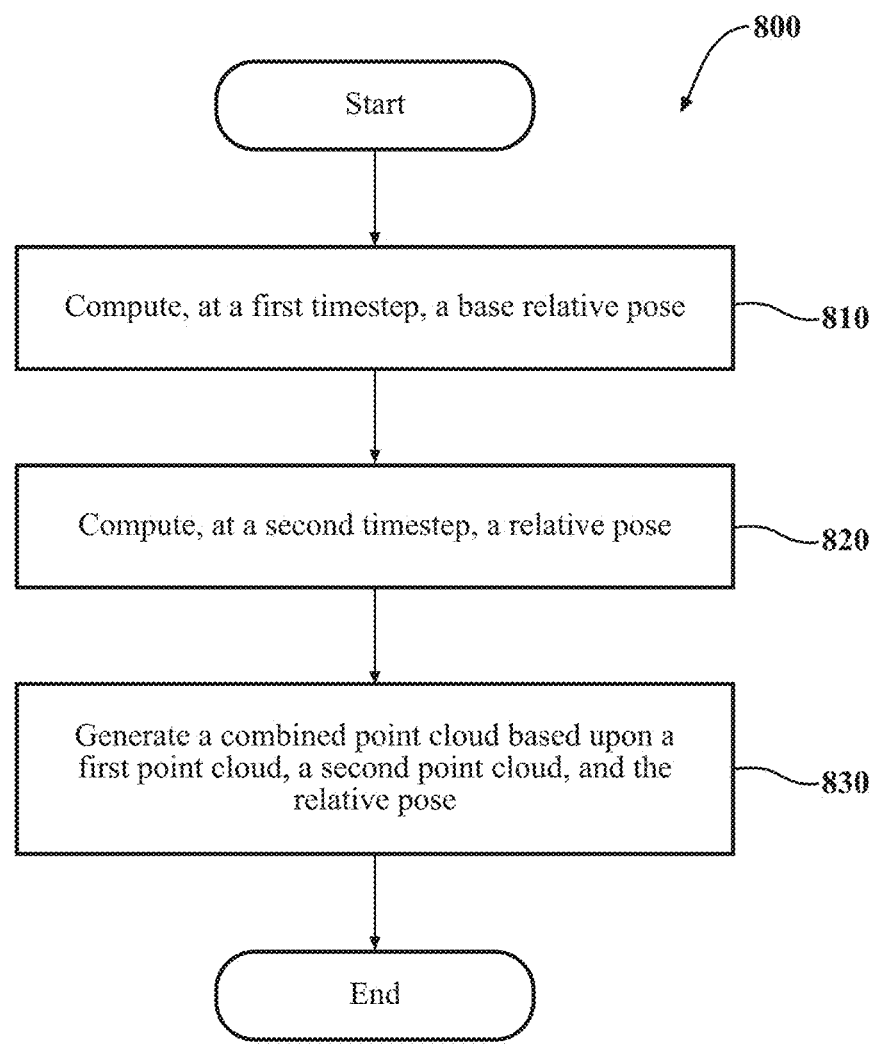
FIG. 8 illustrates one embodiment of another method that is associated with determining a relative pose between an ego vehicle and a remote vehicle.

FIG. 8 illustrates a flowchart of a method 800 that is associated with determining the relative pose 485 between the ego vehicle 100 and the remote vehicle 202. The method 800 will be discussed from the perspective of the cooperative perception system 170 of FIGS. 1 and 4. While the method 800 is discussed in combination with the cooperative perception system 170, it should be appreciated that the method 800 is not limited to being implemented within the cooperative perception system 170 but is instead one example of a system that may implement the method 800.

At 810, at a first timestep, the cooperative perception module 420 computes the base relative pose 465 based upon respective point clouds of the ego vehicle 100 and the remote vehicle 202 (e.g., the base ego vehicle point cloud 455 and the base remote vehicle point cloud 460). According to embodiments, the cooperative perception module 420 obtains the respective point clouds. The cooperative perception module 420 receives the base remote vehicle point cloud 460 from the remote vehicle 202. According to embodiments, the cooperative perception module 420 computes the base relative pose 465 at a first frequency, such as 1 Hz. According to embodiments, the cooperative perception module 420 computes the base relative pose 465 by applying an iterative closest point (ICP) algorithm to the respective point clouds. According to embodiments, the base relative pose 465 comprises a transformation that minimizes an error metric computed between points of the respective point clouds.

At 820, at a second timestep, the cooperative perception module 420 computes the relative pose 485 between the ego vehicle 100 and the remote vehicle 202 based upon the base relative pose 465, a first temporal relative pose (e.g., the ego vehicle temporal relative pose 475), and a second temporal relative pose (e.g., the remote vehicle temporal relative pose 480). According to embodiments, the cooperative perception module 420 computes the relative pose 485 at a second frequency that is greater than the first frequency. In an example, the second frequency is 10 Hz. The relative pose 485 comprises a translation vector and a rotation matrix. According to embodiments, the cooperative perception module 420 computes the first temporal relative pose based upon the odometry data 470. According to embodiments, the cooperative perception module 420 computes the first temporal relative pose at the second frequency. According to embodiments, the cooperative perception module 420 receives the second temporal relative pose from the remote vehicle 202. According to embodiments, the second temporal relative pose is computed by the remote vehicle 202 at the second frequency. The first temporal relative pose and the second temporal relative pose are respectively indicative of motion changes (i.e., translation and rotation) of the ego vehicle 100 and the remote vehicle 202 between the second timestep and the first timestep.

At 830, the cooperative perception module 420 generates the combined point cloud 210 based upon a first point cloud of the ego vehicle 100 (e.g., the ego vehicle point cloud 206), a second point cloud of the remote vehicle 202 (e.g., the remote vehicle point cloud 208), and the relative pose 485. The first point cloud of the ego vehicle 100 and the second point cloud of the remote vehicle 202 may be indicative of different regions of an environment of the ego vehicle 100 and the remote vehicle 202. According to embodiments, the cooperative perception module 420 generates a transformed point cloud based upon the second point cloud, the translation vector (of the relative pose 485), and the rotation matrix (of the relative pose 485). According to embodiments, the cooperative perception module 420 stitches the first point cloud and the transformed point cloud together to generate the combined point cloud 210. According to embodiments, the cooperative perception module 420 controls the ego vehicle 100 based upon the combined point cloud 210. According to embodiments, the cooperative perception module 420 computes, at a third timestep, a second relative pose between the ego vehicle 100 and the remote vehicle 202 based upon the relative pose 485, a third temporal relative pose of the ego vehicle 100, and a fourth temporal relative pose received from the remote vehicle 202, where the third temporal relative pose and the fourth temporal relative pose are respectively indicative of motion changes of the ego vehicle 100 and the remote vehicle 202 between the third timestep and the second timestep. According to embodiments, the cooperative perception module 420 generates a second combined point cloud based upon a third point cloud of the ego vehicle 100, a fourth point cloud received from the remote vehicle 202, and the second relative pose.

FIG. 1 will now be discussed in full detail as an example environment within which the system and methods disclosed herein may operate. In some instances, the ego vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the ego vehicle 100 is performed according to inputs received from a user (e.g., human driver). In one or more arrangements, the ego vehicle 100 can be a conventional vehicle that is configured to operate in only a manual mode.

In one or more embodiments, the ego vehicle 100 is an autonomous vehicle. As used herein, "autonomous vehicle" refers to a vehicle that operates in an autonomous mode. "Autonomous mode" refers to navigating and/or maneuvering the ego vehicle 100 along a travel route using one or more computing systems to control the ego vehicle 100 with minimal or no input from a human driver. In one or more embodiments, the ego vehicle 100 is highly automated or completely automated. In one embodiment, the ego vehicle 100 is configured with one or more semi-autonomous operational modes in which one or more computing systems perform a portion of the navigation and/or maneuvering of the ego vehicle 100 along a travel route, and a vehicle operator (i.e., driver) provides inputs to the ego vehicle 100 to perform a portion of the navigation and/or maneuvering of the ego vehicle 100 along a travel route.

The ego vehicle 100 can include one or more processors 110. In one or more arrangements, the processor(s) 110 can be a main processor of the ego vehicle 100. For instance, the processor(s) 110 can be an electronic control unit (ECU). The ego vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the ego vehicle 100 is equipped with, including the capabilities and other information about such sensors. As will be explained below, the ego vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the ego vehicle 100. Alternatively, or in addition, at least a portion of the map data 116 and/or the sensor data 119 can be located in one or more data stores 115 that are located remotely from the ego vehicle 100.

As noted above, the ego vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the ego vehicle 100 (including any of the elements shown in FIG. 1). The sensor system 120 can acquire data of at least a portion of the external environment of the ego vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the ego vehicle 100 itself. In one or more arrangements, the vehicle sensor(s) 121 can be configured to detect, and/or sense position and orientation changes of the ego vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the ego vehicle 100. In one or more arrangements, the vehicle sensor(s) 121 can include a speedometer to determine a current speed of the ego vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the ego vehicle 100 and/or information/data about such obstacles. Such obstacles may be stationary objects and/or dynamic objects. The one or more environment sensors 122 can be configured to detect, measure, quantify and/or sense other things in the external environment of the ego vehicle 100, such as, for example, lane markers, signs, traffic lights, traffic signs, lane lines, crosswalks, curbs proximate the ego vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The ego vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The ego vehicle 100 can include an output system 135. An "output system" includes any device, component, or arrangement or groups thereof that enable information/data to be presented to a vehicle passenger (e.g., a person, etc.).

The ego vehicle 100 can include one or more vehicle systems 140. Various examples of the one or more vehicle systems 140 are shown in FIG. 1. However, the ego vehicle 100 can include more, fewer, or different vehicle systems. It should be appreciated that although particular vehicle systems are separately defined, each or any of the systems or portions thereof may be otherwise combined or segregated via hardware and/or software within the ego vehicle 100. The ego vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the ego vehicle 100 and/or to determine a travel route for the ego vehicle 100. The navigation system 147 can include one or more mapping applications to determine a travel route for the ego vehicle 100. The navigation system 147 can include a global positioning system, a local positioning system or a geolocation system.

The processor(s) 110, the cooperative perception system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the ego vehicle 100. The processor(s) 110, the cooperative perception system 170, and/or the autonomous driving module(s) 160 may control some or all of these vehicle systems 140 and, thus, may be partially or fully autonomous.

The processor(s) 110, the cooperative perception system 170, and/or the autonomous driving module(s) 160 can be operatively connected to communicate with the various vehicle systems 140 and/or individual components thereof. For example, returning to FIG. 1, the processor(s) 110, the cooperative perception system 170, and/or the autonomous driving module(s) 160 can be in communication to send and/or receive information from the various vehicle systems 140 to control the movement, speed, maneuvering, heading, direction, etc. of the ego vehicle 100. The processor(s) 110, the cooperative perception system 170, and/or the autonomous driving module(s) 160 may control some or all of these vehicle systems 140.

The processor(s) 110, the cooperative perception system 170, and/or the autonomous driving module(s) 160 may be operable to control the navigation and/or maneuvering of the ego vehicle 100 by controlling one or more of the vehicle systems 140 and/or components thereof. For instance, when operating in an autonomous mode, the processor(s) 110, the cooperative perception system 170, and/or the autonomous driving module(s) 160 can control the direction and/or speed of the ego vehicle 100. The processor(s) 110, the cooperative perception system 170, and/or the autonomous driving module(s) 160 can cause the ego vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The ego vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The ego vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The ego vehicle 100 can include one or more autonomous driving modules 160. The autonomous driving module(s) 160 can be configured to receive data from the sensor system 120 and/or any other type of system capable of capturing information relating to the ego vehicle 100 and/or the external environment of the ego vehicle 100. In one or more arrangements, the autonomous driving module(s) 160 can use such data to generate one or more driving scene models. The autonomous driving module(s) 160 can determine position and velocity of the ego vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the ego vehicle 100 for use by the processor(s) 110, and/or one or more of the modules described herein to estimate position and orientation of the ego vehicle 100, vehicle position in global coordinates based on signals from a plurality of satellites, or any other data and/or signals that could be used to determine the current state of the ego vehicle 100 or determine the position of the ego vehicle 100 with respect to its environment for use in either creating a map or determining the position of the ego vehicle 100 in respect to map data.

The autonomous driving module(s) 160 either independently or in combination with the cooperative perception system 170 can be configured to determine travel path(s), current autonomous driving maneuvers for the ego vehicle 100, future autonomous driving maneuvers and/or modifications to current autonomous driving maneuvers based on data acquired by the sensor system 120, driving scene models, and/or data from any other suitable source such as determinations from the sensor data 450 as implemented by the cooperative perception module 420. "Driving maneuver" means one or more actions that affect the movement of a vehicle. Examples of driving maneuvers include: accelerating, decelerating, braking, turning, moving in a lateral direction of the ego vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the ego vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-8, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A computing system for cooperative perception between an ego vehicle and a remote vehicle, the computing system comprising:
a processor; and
memory communicably coupled to the processor that stores instructions that, when executed by the processor, cause the processor to:
compute, at a first timestep, a base relative pose between the ego vehicle and the remote vehicle based upon respective point clouds of the ego vehicle and the remote vehicle;
compute, at a second timestep, a computed relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep;
generate a combined point cloud based upon a first point cloud of the ego vehicle, a second point cloud received from the remote vehicle, and the computed relative pose; and
control the ego vehicle based upon the combined point cloud.

2. The computing system of claim 1, wherein the instructions fer to compute the base relative pose between the ego vehicle and the remote vehicle comprise further instructions that cause the processor to compute the base relative pose at a first frequency, and wherein the instructions further cause the processor to:
compute the first temporal relative pose based upon odometry data of the ego vehicle, wherein the first temporal relative pose is computed at a second frequency; and
receive the second temporal relative pose from the remote vehicle, wherein the second temporal relative pose is computed at the second frequency.

3. The computing system of claim 2, wherein the first frequency is less than the second frequency.

4. The computing system of claim 1, wherein the instructions to compute the base relative pose between the ego vehicle and the remote vehicle comprises further instructions that cause the processor to apply an iterative closest point (ICP) algorithm to the respective point clouds, and wherein the base relative pose is generated as a by-product of the ICP algorithm.

5. The computing system of claim 1, wherein the first temporal relative pose comprises a first translation vector and a first rotation matrix, wherein the second temporal relative pose comprises a second translation vector and a second rotation matrix, and wherein the base relative pose comprises a base translation vector and a base rotation matrix.

6. The computing system of claim 5, wherein the instructions to compute the computed relative pose between the ego vehicle and the remote vehicle comprise further instructions that cause the processor to:
generate a translation vector based upon the base translation vector summed with a difference between the first translation vector and the second translation vector; and
generate a rotation matrix based upon the base rotation matrix multiplied by a quotient of the first rotation matrix and the second rotation matrix, wherein the computed relative pose comprises the translation vector and the rotation matrix.

7. The computing system of claim 6, wherein the instructions to generate the combined point cloud comprise further instructions that cause the processor to:
generate a transformed point cloud based upon the translation vector, the rotation matrix, and the second point cloud; and
stitch the first point cloud to the transformed point cloud.

8. A non-transitory computer-readable medium for cooperative perception between an ego vehicle and a remote vehicle and including instructions that, when executed by a processor, cause the processor to:
compute, at a first timestep, a base relative pose between the ego vehicle and the remote vehicle based upon respective point clouds of the ego vehicle and the remote vehicle;
compute, at a second timestep, a computed relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep;
generate a combined point cloud based upon a first point cloud of the ego vehicle, a second point cloud received from the remote vehicle, and the computed relative pose; and
control the ego vehicle based upon the combined point cloud.

9. The non-transitory computer-readable medium of claim 8, wherein the instructions further cause the processor to:
compute the first temporal relative pose of the ego vehicle based upon odometry data generated by the ego vehicle.

10. The non-transitory computer-readable medium of claim 8, wherein the instructions further cause the processor to:
transmit a request to the remote vehicle;
receive the second point cloud from the remote vehicle based upon the request; and
receive the second temporal relative pose from the remote vehicle.

11. The non-transitory computer-readable medium of claim 8, wherein the first point cloud represents a first field of view of an environment of the ego vehicle and the remote vehicle, and wherein the combined point cloud represents a second field of view of the environment that is greater than the first field of view.

12. The non-transitory computer-readable medium of claim 8, wherein the instructions further cause the processor to:
generate the first point cloud by way of a first light detection and ranging (LIDAR) sensor of the ego vehicle, wherein the second point cloud is generated by a second LIDAR sensor of the remote vehicle.

13. A method, comprising:
computing, at a first timestep, a base relative pose between an ego vehicle and a remote vehicle based upon respective point clouds of the ego vehicle and the remote vehicle;
computing, at a second timestep, a computed relative pose between the ego vehicle and the remote vehicle based upon the base relative pose, a first temporal relative pose of the ego vehicle, and a second temporal relative pose received from the remote vehicle, wherein the first temporal relative pose and the second temporal relative pose are respectively indicative of motion changes of the ego vehicle and the remote vehicle between the second timestep and the first timestep;

generating a combined point cloud based upon a first point cloud of the ego vehicle, a second point cloud received from the remote vehicle, and the computed relative pose; and controlling the ego vehicle based upon the combined point cloud.

14. The method of claim 13, wherein computing the base relative pose includes computing the base relative pose at a first frequency, the method further comprising:

computing, at the second timestep, the first temporal relative pose based upon odometry data of the ego vehicle, wherein the first temporal relative pose is computed at a second frequency; and receiving, at the second timestep, the second temporal relative pose from the remote vehicle, wherein the second temporal relative pose is computed by the remote vehicle at the second frequency, and wherein computing the computed relative pose comprises computing the computed relative pose at the second frequency, and wherein the first frequency is less than the second frequency.

15. The method of claim 13, further comprising:
obtaining the respective point clouds of the ego vehicle and the remote vehicle.

16. The method of claim 13, wherein the first point cloud and the second point cloud are indicative of different regions of an environment of the ego vehicle and the remote vehicle.

17. The method of claim 13, wherein the computed relative pose comprises a translation vector and a rotation matrix, and wherein generating the combined point cloud based upon the first point cloud, the second point cloud, and the computed relative pose comprises:

generating a transformed point cloud based upon the second point cloud, the translation vector, and the rotation matrix; and stitching the first point cloud and the transformed point cloud together to generate the combined point cloud.

18. The method of claim 13, further comprising:
computing, at a third timestep, a second relative pose between the ego vehicle and the remote vehicle based upon the computed relative pose, a third temporal relative pose of the ego vehicle, and a fourth temporal relative pose received from the remote vehicle, wherein the third temporal relative pose and the fourth temporal relative pose are respectively indicative of second motion changes of the ego vehicle and the remote vehicle between the third timestep and the second timestep; and generating a second combined point cloud based upon a third point cloud of the ego vehicle, a fourth point cloud received from the remote vehicle, and the second relative pose.

* * * * *